(12) United States Patent
Kumar

(10) Patent No.: US 12,513,101 B2
(45) Date of Patent: Dec. 30, 2025

(54) ARTIFICIALLY INTELLIGENT NOTIFICATION MANAGER

(71) Applicant: Dropbox, Inc., San Francisco, CA (US)

(72) Inventor: Madan Kumar, Pleasanton, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/383,159

(22) Filed: Oct. 24, 2023

(65) Prior Publication Data
US 2025/0133051 A1    Apr. 24, 2025

(51) Int. Cl.
| | | |
|---|---|---|
| H04L 51/224 | (2022.01) | |
| G06F 40/30 | (2020.01) | |
| G06Q 10/10 | (2023.01) | |
| H04L 51/02 | (2022.01) | |
| H04L 51/216 | (2022.01) | |
| H04L 67/55 | (2022.01) | |

(52) U.S. Cl.
CPC ............ H04L 51/224 (2022.05); G06F 40/30 (2020.01); G06Q 10/10 (2013.01); H04L 51/02 (2013.01); H04L 51/216 (2022.05); H04L 67/55 (2022.05)

(58) Field of Classification Search
CPC ..... H04L 51/224; H04L 51/02; H04L 51/216; H04L 67/55; G06F 40/30; G06Q 10/10
See application file for complete search history.

(56) References Cited

U.S. PATENT DOCUMENTS

| | | | |
|---|---|---|---|
| 6,618,716 B1* | 9/2003 | Horvitz | G06F 9/451 |
| | | | 706/55 |
| 9,100,357 B2 | 8/2015 | Duarte et al. | |
| 10,469,429 B2 | 11/2019 | Hardee et al. | |
| 10,733,981 B2 | 8/2020 | Yardley | |
| 10,946,279 B1 | 3/2021 | Juenger et al. | |
| 11,314,563 B1* | 4/2022 | Singh | G06F 9/541 |
| 11,363,434 B1* | 6/2022 | Malinowski | G08G 1/096791 |
| 11,665,118 B2 | 5/2023 | Neumann | |
| 11,714,966 B2 | 8/2023 | Zong et al. | |

(Continued)

OTHER PUBLICATIONS

Carbune V., et al., "Context Based Automatic Email Responses," Technical Disclosure Commons, Nov. 7, 2017, pp. 1-8.

*Primary Examiner* — William G Trost, IV
*Assistant Examiner* — Adam A Cooney
(74) *Attorney, Agent, or Firm* — Polsinelli PC

(57) ABSTRACT

The present technology is directed to a notification manager which provides a consolidated notification assistant interface for managing notifications received across a plurality of sources, such as applications and channels. The notification manager can group similar notifications in the consolidated notification assistant interface. The notification manager can automatically respond to some notifications, and provide a status regarding whether a responsive notification has been sent, or whether a responsive notification has been prepared that needs review, etc. For example, the notification manager can propose responsive notifications to some notifications, and provide a call to action for the user account to review the proposed responsive notification and to send the proposed responsive notification. The user associated with the user account can interact with the notification manager by giving natural language instructions by interacting with a chatbot to instruct the notification manager to take actions.

20 Claims, 8 Drawing Sheets

(56) References Cited

U.S. PATENT DOCUMENTS

| | | | |
|---|---|---|---|
| 2012/0112908 A1* | 5/2012 | Prykari | H04L 67/55 |
| | | | 340/540 |
| 2012/0124147 A1 | 5/2012 | Hamlin et al. | |
| 2013/0007665 A1* | 1/2013 | Chaudhri | G06F 3/04883 |
| | | | 715/833 |
| 2013/0328665 A1 | 12/2013 | Cranfill et al. | |
| 2014/0129661 A1* | 5/2014 | Thyagaraja | H04L 51/224 |
| | | | 709/207 |
| 2014/0201289 A1 | 7/2014 | Wheeler et al. | |
| 2014/0304616 A1 | 10/2014 | Park et al. | |
| 2014/0372525 A1* | 12/2014 | Raghavan | G06Q 10/1093 |
| | | | 709/204 |
| 2015/0120845 A1 | 4/2015 | McClard et al. | |
| 2016/0065519 A1 | 3/2016 | Waltermann et al. | |
| 2017/0329654 A1* | 11/2017 | Liensberger | G06Q 10/10 |
| 2018/0239495 A1 | 8/2018 | Sharifi et al. | |
| 2019/0089668 A1* | 3/2019 | DeLuca | H04W 4/80 |
| 2020/0004877 A1 | 1/2020 | Ghafourifar et al. | |
| 2020/0012423 A1* | 1/2020 | Cinek | H04W 68/005 |
| 2020/0037038 A1* | 1/2020 | Shoop | H04N 21/478 |
| 2020/0117672 A1 | 4/2020 | Kogan et al. | |
| 2020/0145358 A1* | 5/2020 | Yegorin | H04L 51/224 |
| 2020/0153924 A1* | 5/2020 | Milanese | H04L 51/226 |
| 2020/0233539 A1* | 7/2020 | Liu | G06F 3/0481 |
| 2020/0387411 A1* | 12/2020 | Chu | G06F 16/5866 |
| 2022/0231981 A1* | 7/2022 | Patel | H04L 51/226 |
| 2022/0365993 A1* | 11/2022 | Voisin | G06F 40/30 |
| 2023/0214111 A1* | 7/2023 | Qu | G06F 3/04886 |
| | | | 715/835 |
| 2023/0283687 A1* | 9/2023 | Aher | H04L 67/55 |
| | | | 709/224 |
| 2023/0362184 A1* | 11/2023 | Gelman | H04L 63/1433 |
| 2024/0087240 A1* | 3/2024 | Kulkarni | G06F 40/30 |
| 2024/0177054 A1* | 5/2024 | Li | G06N 20/00 |
| 2024/0330090 A1* | 10/2024 | Mandal | G06F 11/0769 |

\* cited by examiner

ARTIFICIALLY INTELLIGENT NOTIFICATION MANAGER

BACKGROUND

Organizations and teams use a variety of tools to collaborate on tasks and most of these tools provide their own communication features. While these notifications improve information flow amongst relevant parties, parties to these communications can easily get flooded with too many notifications. When parties to these communications get too many notifications, they can miss important information, forget the contents of a notification, or forget where or when they saw the notification. Additionally, since notifications are designed to attract a user's attention, notifications can also be distracting.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
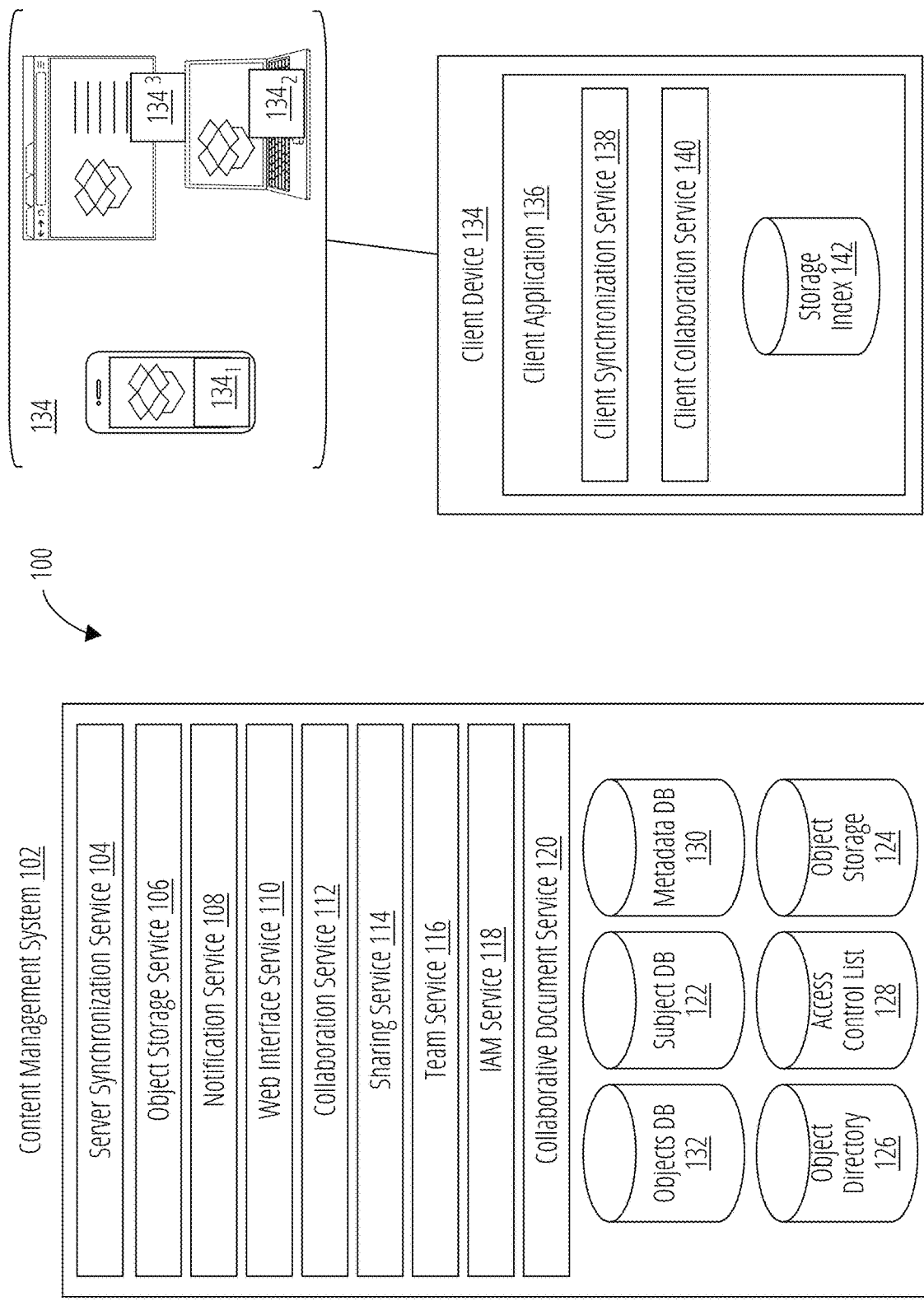
FIG. 1 illustrates an example of a content management system and client devices in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Organizations and teams use a variety of tools to collaborate on tasks and most of these tools provide their own communication features. While these notifications improve information flow amongst relevant parties, parties to these communications can easily get flooded with too many notifications. When parties to these communications get too many notifications, they can miss important information, forget the contents of a notification, or forget where or when they saw the notification. Additionally, since notifications are designed to attract a user's attention, notifications can also be distracting.

The present technology is directed to a notification manager which provides a consolidated notification assistant interface for managing notifications received across a plurality of sources, such as applications and channels. The notification manager can group similar notifications in the consolidated notification assistant interface. The notification manager can automatically respond to some notifications, and provide a status regarding whether a response has been sent, or whether a response has been prepared that needs review, etc. For example, the notification manager can propose responses to some notifications, and provide a call to action for the user account to review the proposed response and to send the proposed response. The user associated with the user account can interact with the notification manager by giving natural language instructions by interacting with a chatbot to instruct the notification manager to take actions such as sending proposed responses, revising proposed responses, and authorizing the sharing of information with user accounts sending notifications requiring responses. The notification manager can also prepare summaries and prioritize informational notifications that might not require a response.

The present technology can be carried out by the notification manager which receives messages in the organization in a data lake. The messages are tagged with entities that have access to the messages. In some embodiments, it is possible for the user account or team to have their own instance of a large language model (LLM) that is fine-tuned using notifications and data accessible to the user account or team so that the LLM's knowledgebase starts to track the knowledgebase of the user account or team.

When a notification is received, the notification manager can categorize the notification and determine the context for the notification based on data from the channel and thread in which the notification originated. The notification manager can organize notifications based on the categories of the notifications. Notifications with similar categories can be analyzed to determine if they are similar to notifications received on different channels.

As introduced above, the notification manager can formulate a response to notifications needing a response based on responses to past notifications having the same categories. In some embodiments, the notification manager can formulate a response to a notification from analysis of relevant information identified in the data lake that is accessible to the parties of the notification.

The notification manager can provide a confidence score indicating a confidence in correctly identifying the category of the notification, recognizing the context of the notification, the quality of the proposed response, and correctly identifying that the participants on the notification can receive the proposed response. If any confidence score is not high enough to take automatic action, then the notification manager can prompt the user for review and feedback.

In some embodiments, the notification manager might also be able to look at organizational knowledge and suggest other sources (e.g., users) to respond to the notification.

The present technology overcomes a variety of problems caused by the avalanche of notifications from multiple sources which is common in many organizations. For example, the consolidated notification assistant interface can provide a single user interface to interact with notifications from different sources. In this way, users are not left searching for previously viewed notifications across different sources.

Additionally, the notification manager of the present technology can automatically respond to notifications or at least prepare suggested responses. In this way, users can be freed from time spent responding to questions that are similar to those they have responded to in the past.

The notification manager can also categorize and group similar messages. Sometimes user accounts receive similar messages in multiple channels, and the notification manager can group these messages together so that a user account can handle similar notifications together.

The notification manager can also be used to aggregate knowledge of a user account, a team, or an organization. This aspect of the present technology can yield long-term memory of projects that might otherwise be forgotten and be used to improve responses to notifications with more complete answers.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In some embodiments the disclosed technology is deployed in the context of a content management system having object synchronization capabilities and collaboration features, among others. An example system 100 configuration is shown in FIG. 1, which depicts content management system 102 interacting with client device 134.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g., various tiers of free or paid accounts), storage space allocated, storage space used, client devices 134 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 132. Objects database 132 can also include a subject account identifier that identifies the subject IDs that have access to the object.

In some embodiments, objects database 132 can be broken into a plurality of tables, indexes and other data structures.

Each of the various storages/databases such as object storage 124, object directory 126, objects database 132, and metadata database 130 can be comprised of more than one such storage or database and can be distributed over many devices and locations. Other configurations are also possible. For example, data from object storage 124, object directory 126, objects database 132, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 132. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client device 134 depending on the file system used by client device 134.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 132. Objects database 132 can include the object ID of the object and can optionally include a description of the change or access action along with a time stamp or version number and any other relevant data. Objects database 132 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 132.

Object Synchronization

Another feature of content management system 102 is synchronization of objects with at least one client device 134. Client device(s) 134 can take different forms and have different capabilities. For example, client device 134 can be a computing device having a local file system accessible by multiple applications resident thereon. Client device 134 can be a computing device wherein objects are only accessible to a specific application or by permission given by the specific application, and the objects are typically stored either in an application specific space or in the cloud. Client device 134 can be any client device accessing content management system 102 via a web browser and accessing objects via a web interface. While example client device 134 is depicted in form factors such as a laptop, mobile device, or web browser, it should be understood that the descriptions thereof are not limited to devices of these example form factors. For example, a mobile device might have a local file system accessible by multiple applications resident thereon, or might access content management system 102 via a web browser. As such, the form factor should not be considered limiting when considering client 134's capabilities. One or more functions described herein with respect to client device 134 may or may not be available on every client device depending on the specific capabilities of the device—the file access model being one such capability.

In many embodiments, client devices 134 are associated with an account of content management system 102, but in some embodiments, client devices 134 can access content using shared links and do not require an account.

As noted above, some client devices can access content management system 102 using a web browser. However, client devices can also access content management system 102 using client application 136 stored and running on client device 134. Client application 136 can include a client synchronization service 138.

Client synchronization service 138 can be in communication with server synchronization service 104 to synchronize changes to objects between client device 134 and content management system 102.

Client device 134 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 134.

Objects can be synchronized from client device 134 to content management system 102, and vice versa. In embodiments wherein synchronization is from client device 134 to content management system 102, a subject can manipulate objects directly from the file system of client device 134, while client synchronization service 138 can monitor directory on client device 134 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client device 134.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 132, metadata database 130, object directory 126, object storage 124, subject database 122, etc. as appropriate.

When synchronizing from content management system 102 to client device 134, data regarding a mount, modification, addition, deletion, move of an object recorded in objects database 132 can trigger a notification to be sent to client device 134 using notification service 108. When client device 134 is informed of the change, client device 134 can make a request for changes listed in objects database 132 since the last synchronization point known to the client device. When client device 134 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 134 to content management system 102.

Sometimes client device 134 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 134 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client device 134 attempts to access the object, client synchronization service 138 can retrieve the data of the object from content management system 102 and provide the complete object to client device 134. This approach can provide significant space and bandwidth savings while still providing full access to a subject's objects on content management system 102.

While the synchronization embodiments addressed above referred to client device 134 and a server of content management system 102, it should be appreciated by those of ordinary skill in the art that a user account can have any number of client devices 134 all synchronizing objects with content management system 102, such that changes to an object on any one client device 134 can propagate to other client devices 134 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments, a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 134. The sharing can be performed in a platform agnostic manner. That is, the content can be shared across multiple client devices 134 of varying type, capabilities, operating systems, etc. The content can also be shared across varying types of subject accounts.

To share an object within content management system 102 sharing service 114 can add associate a subject ID of a team or of one or more subject accounts with a content item in objects database 132 associated with the object, thus granting the added subject account(s) access to the object. Sharing service 114 can also remove subject IDs from being permitted to access a content item in objects database 132 to restrict a subject account's access to the object. Sharing service 114 can record object identifiers, subject identifiers given access to an object, and access levels in objects database 132. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 132. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 132 that a URL to the object has been created. In some embodiments, an entry into objects database 132 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 132 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g., a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 134 is accessing the object. Notifications service 108 can then notify all client devices of other subjects having access to the same object of the presence of the subject of client device 134 with respect to the object.

In some embodiments, content management system 102 can report a history of subject interaction with a shared object. Collaboration service 112 can query data sources such as metadata database 130 and objects database 132 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments, content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client device 134. In embodiments wherein an object is accessed by a native application stored and executed on client device 134, where the object is in a designated location of the file system of client device 134 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client device 134, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 134 can connect to content management system 102 on behalf of a subject. A subject can directly interact with client device 134, for example when client device 134 is a desktop or laptop computer, phone, television, internet-of-things device, etc. Alternatively or additionally, client device 134 can act on behalf of the subject without the subject having physical access to client device 134, for example when client device 134 is a server.

Some features of client device 134 are enabled by an application installed on client device 134. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client device 134 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
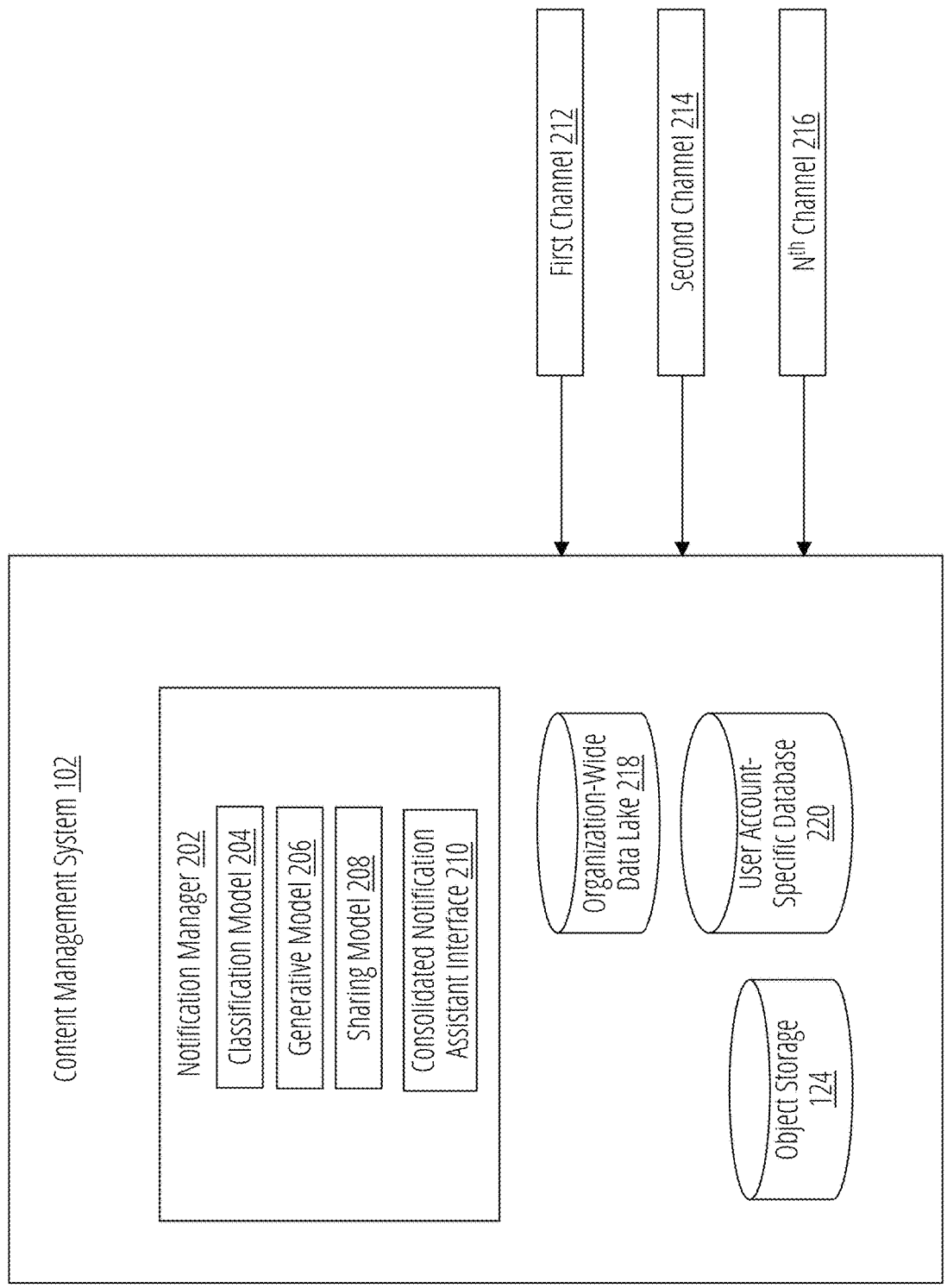
FIG. 2 illustrates additional detail of the content management system where the content management system includes a notification manager in accordance with some aspects of the present technology.

FIG. 2 illustrates additional detail of the content management system where the content management system includes a notification manager in accordance with some aspects of the present technology. FIG. 2 is provided as an example to aid in describing the present technology. Although a particular arrangement of components is depicted in FIG. 2, the arrangement of such components should not be considered limiting of the present technology unless otherwise specified in the appended claims. For example, while FIG. 2 illustrates the notification manager as part of the content management system, it will be appreciated by those of ordinary skill in the art that the notification manager can perform its functions as a service independently of a content management system. In some embodiments, the notification manager can be outside of and separate from the content management system, and the notification manager can be accessed by the content management system or other devices or systems as a service.

As illustrated in FIG. 2, the notification manager 202 is configured to manage notifications from a plurality of sources into a single service. This can allow for the classification of notifications, and to allow the notification manager to learn from past responses to notifications in order to suggest responsive notifications or automatically respond to received notifications. In general, the notification manager 202 is a service for managing notifications in a more convenient and less time-consuming manner.

The notification manager can provide a consolidated notification assistant interface for managing notifications received across a plurality of sources, such as applications and channels. FIG. 2 illustrates three sources of notifications: a first channel 212, a second channel 214, and an $n^{th}$ channel 216. The sources of notifications can be accessible to the content management system 102 and the notification manager 202. Notifications received from the sources of notifications can be stored in one or both of the organization-wide data lake 218 and user account-specific database 220.

In some embodiments, the managing of notifications involves classifying notifications using classification model 204. When a notification is received, the notification manager can categorize the notification, and determine the context for the notification based on data from the channel and/or thread in which the notification originated. The notification manager can first organize notifications based on the categories of the notifications. Notifications with similar categories can be analyzed to determine if they are similar to notifications received on different channels.

In addition, the notification manager 202 can be configured to automatically provide responsive notifications or proposed responsive notifications to notifications. For example, a notification manager can use generative model 206 for this purpose. The generative model 206 can be an artificial intelligence tool that is configured to prepare responsive notifications to notifications. In some embodiments, the generative model 206 can be based on a LLM. As will be addressed in greater detail herein, the generative model 206 can also be one or more models that are fine-tuned to prepare responsive notifications that are specific to a user account or to the organization in general.

Since the notification manager 202 can automatically send responsive notifications or at least prepare proposed responses to notifications, the notification manager 202 can also be configured to determine whether it is appropriate or allowed to share the content of such responsive notifications with other users. For example, if a notification sender sends a notification requesting a responsive notification to a question, and the notification manager 202 prepares a response to the notification, the notification manager should determine whether it is appropriate to send the responsive notification to the sender of the notification to which is being responded. Accordingly, the notification manager 202 can employ a sharing model 208 for this purpose. The sharing model 208 can be a machine learning model that is configured to determine the types of content to which the sending user already has access and to determine the confidentiality of the content of the automatically prepared responsive notification.

Figure 3:
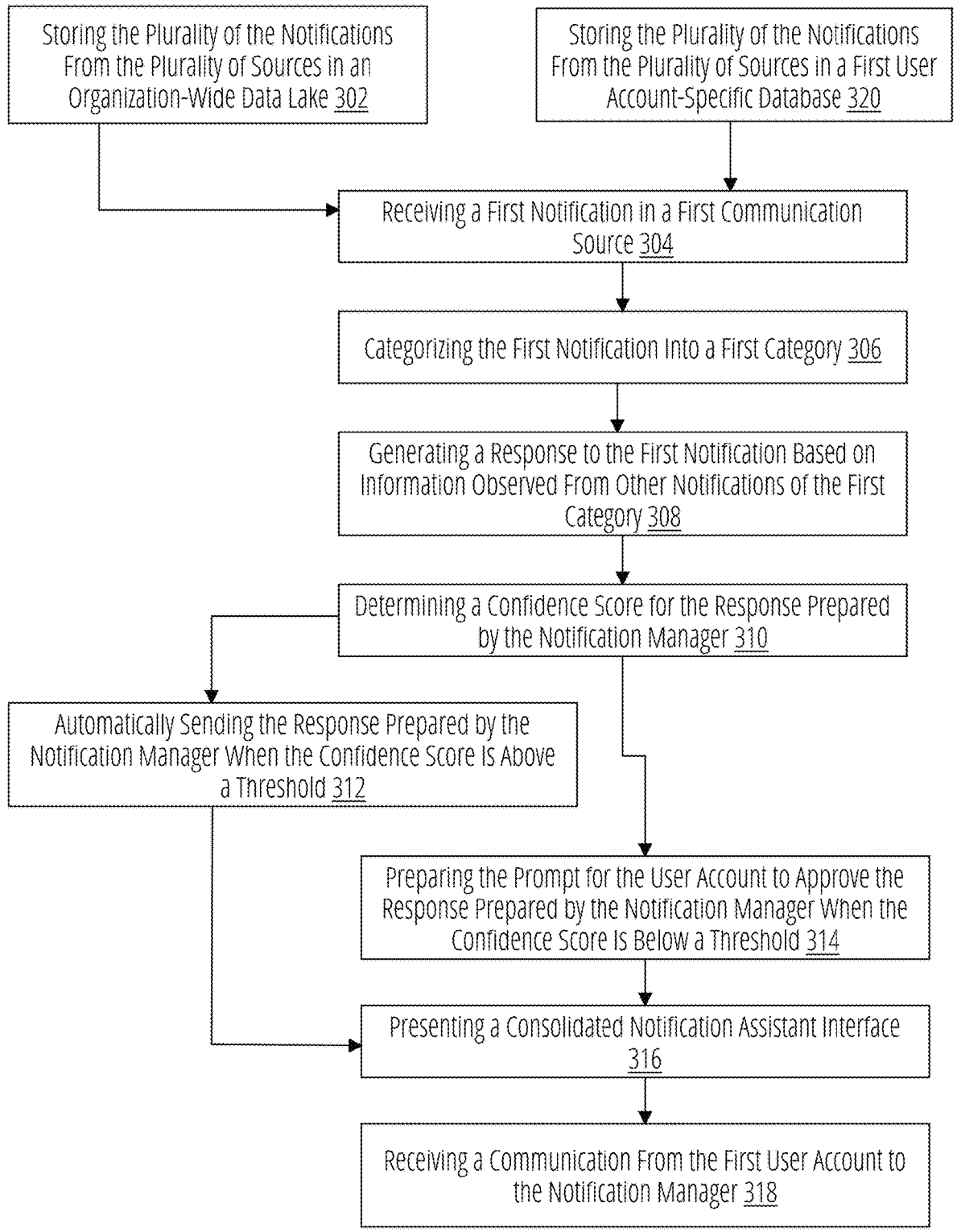
FIG. 3 illustrates an example method for managing notifications, presenting notifications, and proposing responses to notifications in accordance with some aspects of the present technology.

Additional detail about the functioning of many of the components of the notification manager 202 is addressed with respect to FIG. 3.

FIG. 3 illustrates an example method for managing notifications, presenting notifications, and proposing responsive notifications to notifications in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. Additionally, some of the depicted operations may be optional, and some operations that are not depicted might be part of the method. In other examples, different components of an example device or system that implements the method may perform functions at substantially the same time or in a specific sequence.

According to some examples, the method includes storing the plurality of the notifications from the plurality of sources in an organization-wide data lake at block 302 and/or in a first user account-specific database at block 320. Whether the plurality of notifications are stored in the organization-wide data lake 218 or user account-specific database 220 is a question of how the notification manager 202 is set up and a question of what information the classification model 204, the generative model 206, and sharing model 208 should have access to. When notifications are stored in the organization-wide data lake 218, the notification manager 202 can gain intelligence based on all notifications received in the organization. But when notifications are stored in the user account-specific database 220, the notification manager 202 can gain intelligence based on all notifications received by a specific user account. The notifications are stored in the organization-wide data lake 218 or user account-specific database 220 with metadata identifying parties to the notifications.

In some aspects, it can be beneficial to use a combination of approaches wherein notifications can be stored in organization-wide data lake 218, but the classification of notifications or the automatically generated responsive notifications could be generated from responsive notifications to notifications addressed to a particular user account. This can be accomplished by fine-tuning one or more models (classification model 204, generative model 206, etc.) using a subset of notifications stored in the organization-wide data lake 218 that are addressed to the particular user account. In this way, there could be many versions of generative models 206 that are specific to different user accounts.

A benefit of having a user account-specific generative model 206 is that the generative model would learn to mimic the responsive notification style of the user account, and thereby is more likely to provide automatic or proposed responsive notifications that are likely to be approved by the user account since the responsive notifications should be more similar to the responsive notifications that would be authored by the user account. However, it can be computationally expensive to fine tune the generative model 206 for each user account, and the computational expense might not yield a generative model 206 that is sufficiently better than a generative model 206 that is fine-tuned on organization data.

Regardless of whether the generative model 206 is fine-tuned to provide better responsive notifications for an organization or a specific user account, the present technology has an interesting side effect that user accounts can become containers for certain topics in an organization's knowledge base. Whether the notifications are stored in an organization-wide data lake 218 or user account-specific database 220, the notifications are associated with the user account to which they are addressed. User accounts are therefore associated with a unique collection of notifications that collectively represent a portion of the knowledge and experiences of that user account within the organization. This has two consequences worth mentioning.

First, the notification manager and its associated AI/ML models can learn to associate specific user accounts as being a label associated with certain types of knowledge. This might help in the classification of notifications and in the generation of proposed responsive notifications.

Second, the organization will want to create a knowledge inheritance structure as members of the organization depart the organization. Accordingly, the present technology can include a mechanism to merge the first user account-specific database with a second user account-specific database for a user account at the same organization when the first user account has left the organization. Or when the notifications are stored in the organization-wide data lake 218 the user account labels associated with the notifications can be updated or otherwise associated with a second-user account to maintain the continuity of knowledge.

Irrespective of whether the notifications are stored in the organization-wide data lake 218 or user account-specific database 220, or whether there is a generative model 206 that is fine-tuned to a user account, the notification manager can manage notifications as addressed in the rest of FIG. 3.

According to some examples, the method includes receiving a first notification in a first communication source at block 304. For example, the notification manager 202 illustrated in FIG. 2 may receive a first notification in a first communication source. The first notification is directed to a first user account. As addressed above, a source can be a channel such as an app that sends notifications or a topic within a communications app (e.g., a SLACK channel, ZOOM channel, WEBEX space, DISCORD server or channel, a text chain, or instant message chain, etc.). A source can also be a communication thread within a channel (e.g., a subset of the communications within a channel that generally includes at least one message and reply on the same topic. In some instances, a channel might have an explicit sub-organization that identifies threads.

According to some examples, the method includes categorizing the first notification into a first category at block 306. For example, the notification manager 202 illustrated in FIG. 2 may categorize the first notification into a first category. The first category is based on the content of the first notification and categories learned from a plurality of notifications from a plurality of sources.

More specifically, the classification of the first notification includes determining a context for the first notification based on data from a channel and a thread in which the first notification. Additionally, the classification of the first notification includes utilizing a classification model 204 to match the first notification to the first category based on the content of the first notification and the data from the channel and the thread in which the first notification was received. In some aspects, the classification model 204 uses the text of the first notification and text from the channel leading up to the first notification to gain context for the first notification when classifying the first notification into the first category. The classification model 204 can be an algorithm that classifies notifications according to a defined scheme, or it can be a learned algorithm such as created by a machine learning algorithm.

In some aspects, the aim of the classification of notifications is to identify notifications that pertain to a similar topic as the first notification (e.g., the first category is a topic-based category). In some aspects, the classification also aims to identify notifications that both pertain to a similar topic and that are addressed to the same user account (e.g., the first category is a junction of a topic and user account).

According to some examples, the method includes generating a responsive notification to the first notification based on information observed from other notifications of the first category at block 308. For example, the notification manager 202 illustrated in FIG. 2 may generate a responsive notification to the first notification based on information observed from other notifications of the first category. The information observed from other notifications of the first category includes responsive notifications to past notifications in the first category. The other notifications of the first category can include notifications received on different channels than the first notification. More specifically, the notification manager 202 can use a generative model 206 to generate the responsive notification to the first notification, where the generative model can use the other notifications in the first category to provide some of the content that is included in the responsive notification. In some aspects, the generative model 206 uses the text of the first notification and text from the channel leading up to the first notification to gain context for the first notification when generating the responsive notification to the first notification.

By classifying the first notification into the first category, the responsive notification generation can be improved and can mitigate limitations of some generative models 206. For example, generative models 206 which incorporates a large language model are known to hallucinate some of their generated content. However, a generative large language model is much less likely to hallucinate when the content of its responsive notifications is focused on a relevant dataset. Accordingly, by classifying the notification first, the notification manager 202 can identify prior responsive notifications to similar notifications and can use the generative model 206 to craft a responsive notification with similar content as prior responsive notifications.

In practice, this can be very useful when a first user account receives multiple notifications asking similar questions. Rather than the first user account repeatedly crafting responsive notifications with similar content, the notification manager can automatically craft responsive notifications based on the previous responsive notifications provided by the first user account.

The capabilities of the notification manager 202 can be expanded as the notification manager 202 has access to greater amounts of data. For example, if the notification manager 202 has access to objects associated with the user account in the object storage 124, the notification manager 202 can harvest information from these objects to aid in generating responsive notifications. For example, the notification manager 202 can search the organization-wide data lake 218 or the object storage 124 for additional information that is relevant to the first notification. This can provide the benefit that the notification manager 202 can generate responsive notifications based on data that might not have been shared in previous notifications. Similarly, if the notification manager 202 has access to the organization-wide data lake 218 that can include notifications and objects from many different user accounts in the organization, irrespective of the respective user account to which the notifications are addressed, the notification manager 202 may be able to generate responsive notifications using data extracted from those sources too.

Further, when the notification manager 202 has access to the entire object storage 124 or the organization-wide data lake 218, the notification manager 202 can determine another user account other than the first user account that is associated with notifications or documents relevant to a query within the first notification, and can provide a suggestion to contact the user account other than the first user account to receive additional information relevant to the query. In some embodiments, the notification manager 202 can automatically send a notification to the additional user account or add the additional user account to the channel that includes the first notification.

Part of generating a proposed responsive notification is also to determine if the information contained in the responsive notification can be shared with the second user account(s) that will be the recipient of the responsive notification. Accordingly, the notification manager 202 can utilize a sharing model 208 to determine whether the second user account(s) that will be the recipient of the responsive notification should be allowed to receive the answer that they request. The sharing model 208 can be trained using both a labeled dataset of responsive notifications that were permitted to be sent to recipients of responsive notifications and notifications for which a responsive notification that included the sought information was not provided.

In some embodiments, the sharing model is configured to determine a classification of confidentiality for information included in the responsive notification to the first notification. The determination of the classification of confidentiality for information is based on past sharing of the information, sharing of content items including the information, labels indicating a confidential status of channels or documents including the information wherein example classifications can be public, organization confidential, or team confidential. The sharing model 208 can also be trained by learning relationships between content and concepts in the object storage 124 or organization-wide data lake 218 and user accounts that have access to those concepts and concepts. Accordingly, the sharing model 208 can learn to predict which types of information might be public information, which information might be confidential to the organization but can be shared within the organization, and which information might be highly confidential and might be restricted to certain organization members.

While the notification manager 202 might be able to generate a responsive notification, this does not mean that the responsive notification should be provided to the first user account as a proposed responsive notification or automatically sent as a reply on behalf of the user account. The treatment of a generated responsive notification can depend on whether the generative model 206 is confident in its output.

Many machine-learning models, including classifiers and generative models, can be configured to output a confidence interval associated with its output. The confidence score is an indication of the level of certainty or confidence that a model has in its prediction or output for a given input. It provides a measure of how reliable or accurate the model's prediction is believed to be. The confidence score is typically a value between 0 and 1, with 0 meaning low confidence and 1 meaning high confidence. It represents the probability or likelihood that the model's prediction is correct. For example, if the confidence score for a classification task is 0.85, it indicates that the model is 85% confident in its prediction. Typically, the confidence score is derived from the underlying architecture, training data, and algorithm of the machine learning model. It can be influenced by various factors, such as the quality and representativeness of the training data, the complexity of the model, and the certainty of the input data.

Accordingly, the present technology can handle a generated responsive notification differently depending on the confidence scores of one or more aspects of the responsive notification as explained herein.

According to some examples, the method includes determining a confidence score for the responsive notification prepared by the notification manager at block 310. For example, the notification manager 202 illustrated in FIG. 2 may determine a confidence score for the responsive notification prepared by the notification manager. The confidence score can be one or more scores based on a confidence in one or more of the correct identification of the category, quality of the proposed responsive notification, and correct identification of recipients of the proposed responsive notification.

When the confidence score is based on the correct identification of the category, the score can be an output of the classification model 204. If the confidence score from the classification model 204 is low, it may indicate that the first notification refers to a topic that has not been seen by the first user account or the organization much before and therefore there might not be enough quality data on which to base a responsive notification. In some embodiments, the notification manager 202 might not even attempt to generate a responsive notification when the confidence score from the classification model 204 is below a threshold.

When the confidence score is based on the quality of the proposed responsive notification, the score can be an output of the generative model 206. If the confidence score from the generative model 206 is low, it may indicate that the data from which to base the proposed responsive notification was ambiguous or unclear, or may indicate some other factor related to an uncertainty in the output of the generative model 206. In some embodiments, when a confidence score is too low, and is below a lower threshold, the generated responsive notification is discarded and not shown to the user account. If the confidence score is high enough, and is above an upper threshold, the notification manager 202 might send the generated responsive notification without prompting the first user account to review the responsive notification. Or, if the confidence interval is in a middle range, wherein the responsive notification is good enough to be displayed to the first user account, but not high enough that the responsive notification can be automatically sent, the notification manager 202 can determine to display the responsive notification to the first user account before sending the responsive notification as a reply.

When the confidence score is based on the correct identification of recipients of the proposed responsive notification, the score can be an output of the sharing model 208. If the confidence score from the sharing model 208 is low, it may indicate that the information contained in the responsive notification might be confidential or should not be shared with the intended recipient of the responsive notification. In some embodiments, when the confidence score from the classification model 204 is below a threshold, the notification manager 202 would not automatically send a generated responsive notification, but would instead request the first user account to review the information and might also flag the information as potentially confidential This confidence score can be important to prevent users from sending notifications in attempt to learn information that they should not be allowed to learn.

In some embodiments, the confidence score is comprised of a composite of confidence scores for confidence in one or more of correct identification of the category, quality of the proposed responsive notification, and correct identification of recipients of the proposed responsive notification. Even when the confidence score is a composite score, it may be that the composite score cannot achieve a threshold to automatically send a generated responsive notification if any part of the composite score is below a threshold.

As alluded to above, some generated responsive notifications can be automatically sent to the recipient, while others should be reviewed and approved by the first user account.

Figure 4A:
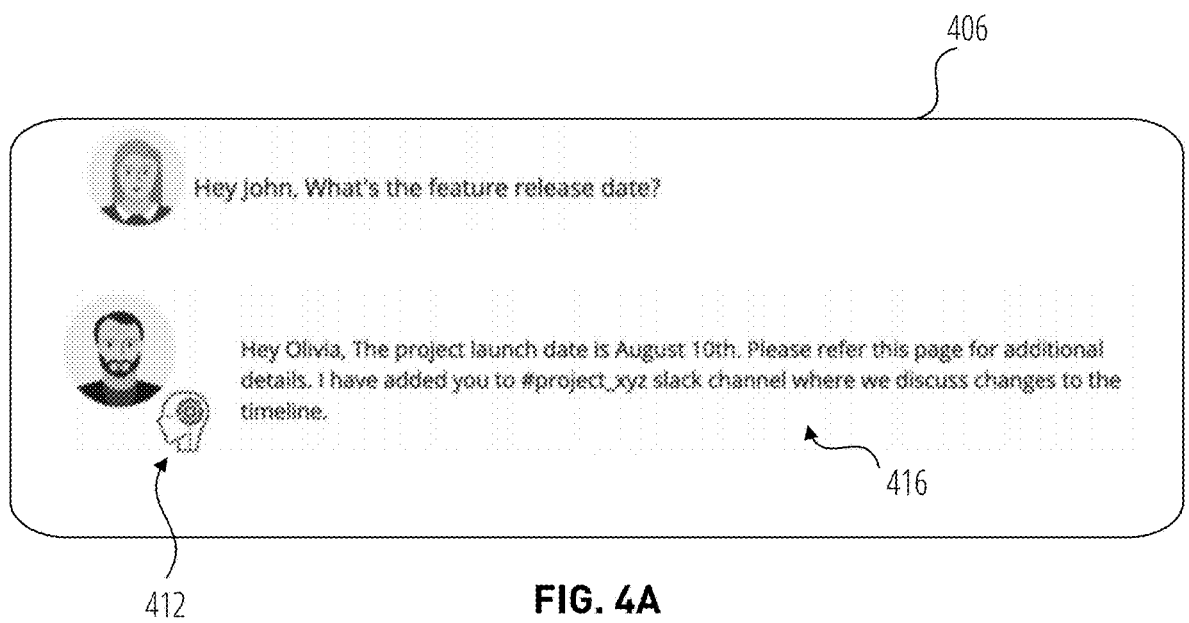
FIG. 4A illustrates an example channel involving a sender of the first notification, and the first user account in accordance with some aspects of the present technology.

According to some examples, the method includes automatically sending the responsive notification prepared by the notification manager when the confidence score is above a threshold at block 312. For example, the consolidated notification assistant interface 210 illustrated in FIG. 2 may automatically send the responsive notification prepared by the notification manager when the confidence score is above a threshold. In other words, there will be situations wherein the notification manager 202 can be highly confident that the generated responsive notification is one that the first user would want to be sent, and the notification manager 202 can automatically send the generated responsive notification on behalf of the first user. An example of this is shown in FIG. 4A which shows a channel 406 involving a sender of the first notification, and the first user account. As shown in FIG. 4A the first user account has responded using a generated responsive notification 416. It is apparent to both the sender of the first notification and the first user account that the notification manager 202 provided the generated responsive notification 416 because an icon 412 for the notification manager 202 appears with the avatar of the first user account.

Figure 4B:
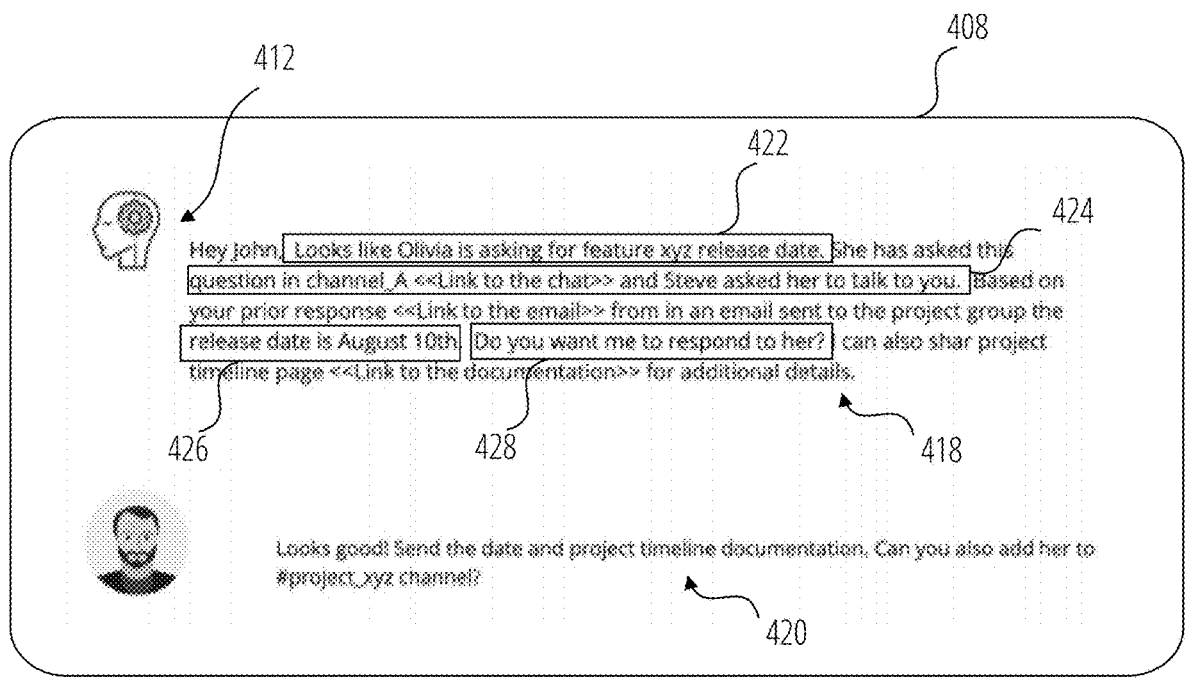
FIG. 4B illustrates an example consolidated notification assistant interface 408 in accordance with some aspects of the present technology.

However, there will also be situations where the notification manager 202 has enough confidence that the generated responsive notification is a good quality responsive notification, but the confidence in one or more categories of confidence scores addressed above make it more prudent to provide the generated responsive notification for review by the first user account. According to some examples, the method includes preparing a prompt for the user account to approve the responsive notification prepared by the notification manager when the confidence score is below a threshold at block 314. For example, the notification manager 202 illustrated in FIG. 2 may prepare the prompt for the user account to approve the responsive notification prepared by the notification manager when the confidence score is below a threshold. While the confidence score is below a threshold to automatically send the responsive notification, the confidence score should still be high enough to indicate a good responsive notification has been prepared. An example of this is shown in FIG. 4B which shows a consolidated notification assistant interface 408. As shown in FIG. 4B the notification manager 202 has provided a proposed responsive notification 418 that includes context for the question provided from the sending user. The first user has provided an instruction in natural language, which the notification manager 202 can interpret working as a chat bot, and send the generated responsive notification 416 as shown in FIG. 4A.

According to some examples, the method includes presenting a consolidated notification assistant interface at block 316. For example, the consolidated notification assistant interface 210 illustrated in FIG. 2 may present a consolidated notification assistant interface. The consolidated notification assistant interface presents at least one thread of communications between the notification manager and the first user account.

As shown in FIG. 4B, a communication in the thread from the notification manager 202 can include a summary of the first notification 422, contextual information for the first notification 424, the responsive notification 426 to the first notification prepared by the notification manager, and a responsive notification status 428. For example, the responsive notification status can be a prompt for the user account to approve the responsive notification prepared by the notification manage, or can inform the first user account that the responsive notification prepared by the notification manager was automatically sent. The contextual information for the first notification can include a summary of other messages in the same thread.

When applicable a communication from the notification manager 202 in the thread can include a summary of at least several of the plurality of notifications from a plurality of sources. For example, the plurality of the notifications may have been received across several channels, but all pertain to the first category, and the notification manager 202 can summarize these notifications in the consolidated notification assistant interface 210.

According to some examples, the method includes receiving a communication from the first user account to the notification manager at block 318. For example, the consolidated notification assistant interface 210 illustrated in FIG. 2 may receive a communication from the first user account to the notification manager.

In some embodiments, the notification manager can participate in the consolidated notification assistant interface as a chat bot and communication from the first user account can be provided in a natural language format as shown in communication 420 of FIG. 4B.

FIG. 4A illustrates an example channel 406 involving a sender of the first notification, and the first user account in accordance with some aspects of the present technology. As shown in FIG. 4A the first user account has responded using a generated responsive notification 416. It is apparent to both the sender of the first notification and the first user account that the notification manager 202 provided the generated responsive notification 416 because an icon 412 for the notification manager 202 appears with the avatar of the first user account.

FIG. 4B illustrates an example consolidated notification assistant interface 408 in accordance with some aspects of the present technology.

As shown in FIG. 4B the notification manager 202 has provided a proposed responsive notification 418 that includes context for the question provided from the sending user. The first user has provided an instruction in natural language, which the notification manager 202 can interpret working as a chat bot, and send the generated responsive notification 416 as shown in FIG. 4A.

While FIG. 4B illustrates a summary of just one notification, the consolidated notification assistant interface 408, the consolidated notification assistant interface 408 can be a single interface for displaying summaries of notifications from across a plurality of channels. And while the proposed responsive notification 418 illustrated in FIG. 4B illustrates an example of a communication from the notification manager 202 requesting approval to respond to the sender of the first notification, the notification manager 202 can also automatically respond. In some embodiments, the notification manager 202 can inform the first user account that a responsive notification was automatically sent.

The first user account can communicate with the notification manager 202 using the consolidated notification assistant interface 408. For example, the first user account can provide a natural language instruction 420, which the notification manager 202 can interpret since it participates in the consolidated notification assistant interface 408 as a chatbot.

Figure 4C:
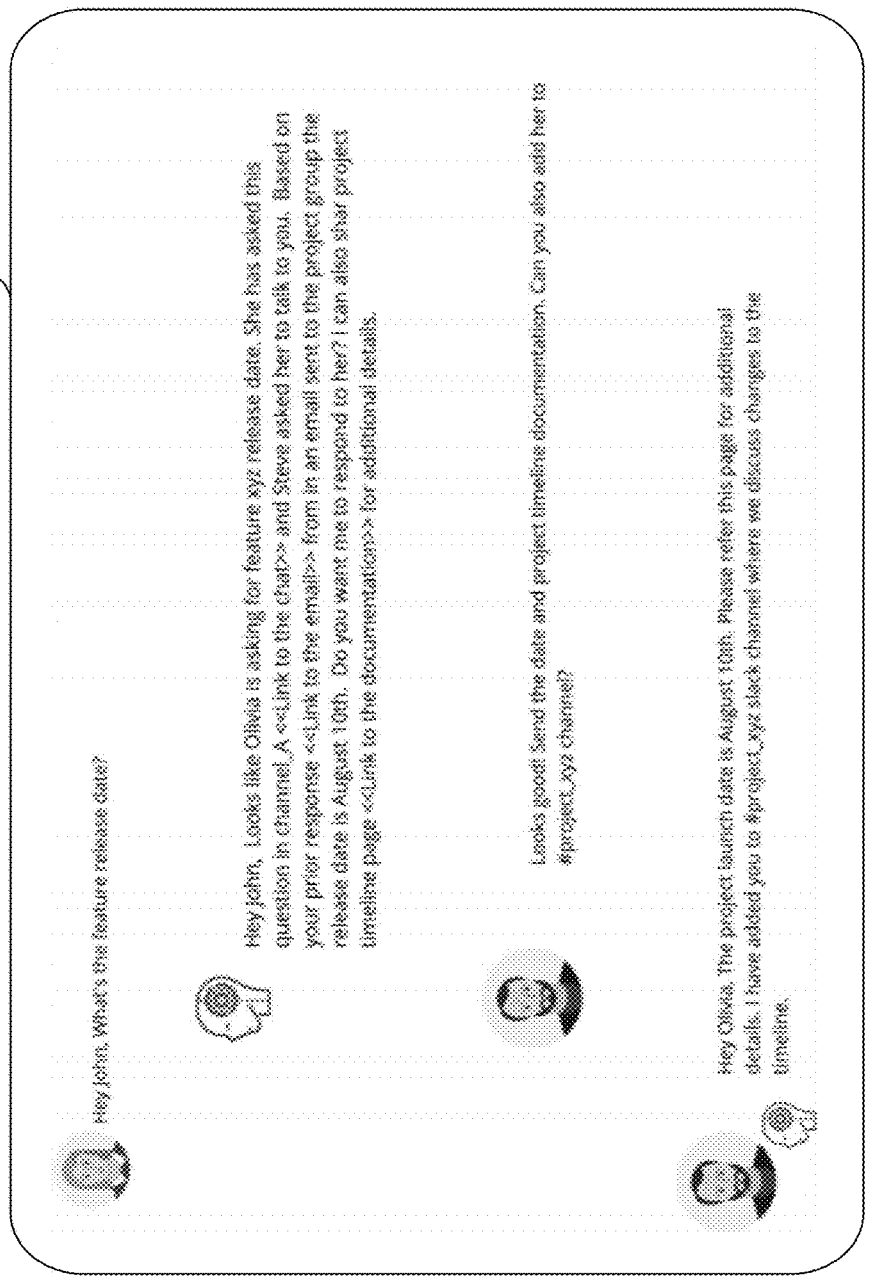
FIG. 4C illustrates an example alternate consolidated notification assistant interface in accordance with some aspects of the present technology.

FIG. 4C illustrates an example alternate consolidated notification assistant interface 410 in accordance with some aspects of the present technology. The alternate consolidated notification assistant interface 410 can be a hybrid of channel 406 shown in FIG. 4A and consolidated notification assistant interface 408 shown in FIG. 4B. The alternate consolidated notification assistant interface 410 can be appropriate when the notification manager 202 is managing a limited number of channels.

In FIG. 4C the alternate consolidated notification assistant interface 410 is a view from the perspective of the first user account where they can see the contents of the channel that is augmented with threads between the first user and the notification manager 202.

Figure 5:
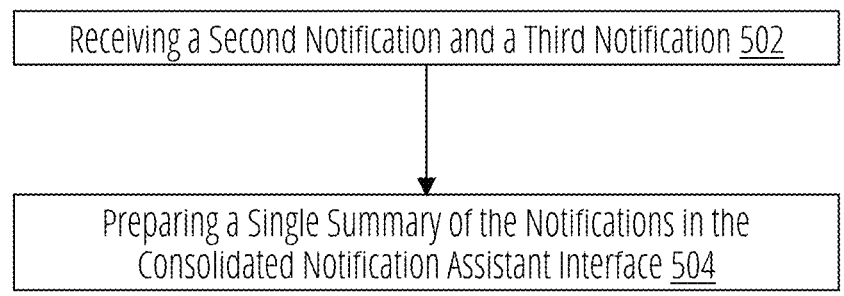
FIG. 5 illustrates an example method for providing an aggregated notification summary in accordance with some aspects of the present technology.

FIG. 5 illustrates an example method for providing an aggregated notification summary in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. Additionally, some of the depicted operations may be optional, and some operations that are not depicted might be part of the method. In other examples, different components of an example device or system that implements the method may perform functions at substantially the same time or in a specific sequence.

As alluded to above, the consolidated notification assistant interface can also provide an interface to collect notifications and provide a digested summary of the notifications. This can be helpful by consolidating the sources of notifications into a single interface. This can also be helpful to group together similar notifications to allow the first user account to be more efficient in getting caught up from notifications that they did not see when they first came in.

According to some examples, the method includes receiving a second notification and a third notification at block 502. For example, the notification manager 202 illustrated in FIG. 2 may receive a second notification and a third notification. The second notification and the third notification contain similar information but are received in different channels.

According to some examples, the method includes preparing a single summary of the notifications in the consolidated notification assistant interface at block 504. For example, the notification manager 202 illustrated in FIG. 2 may prepare a single summary of the notifications in the consolidated notification assistant interface.

Figure 6:
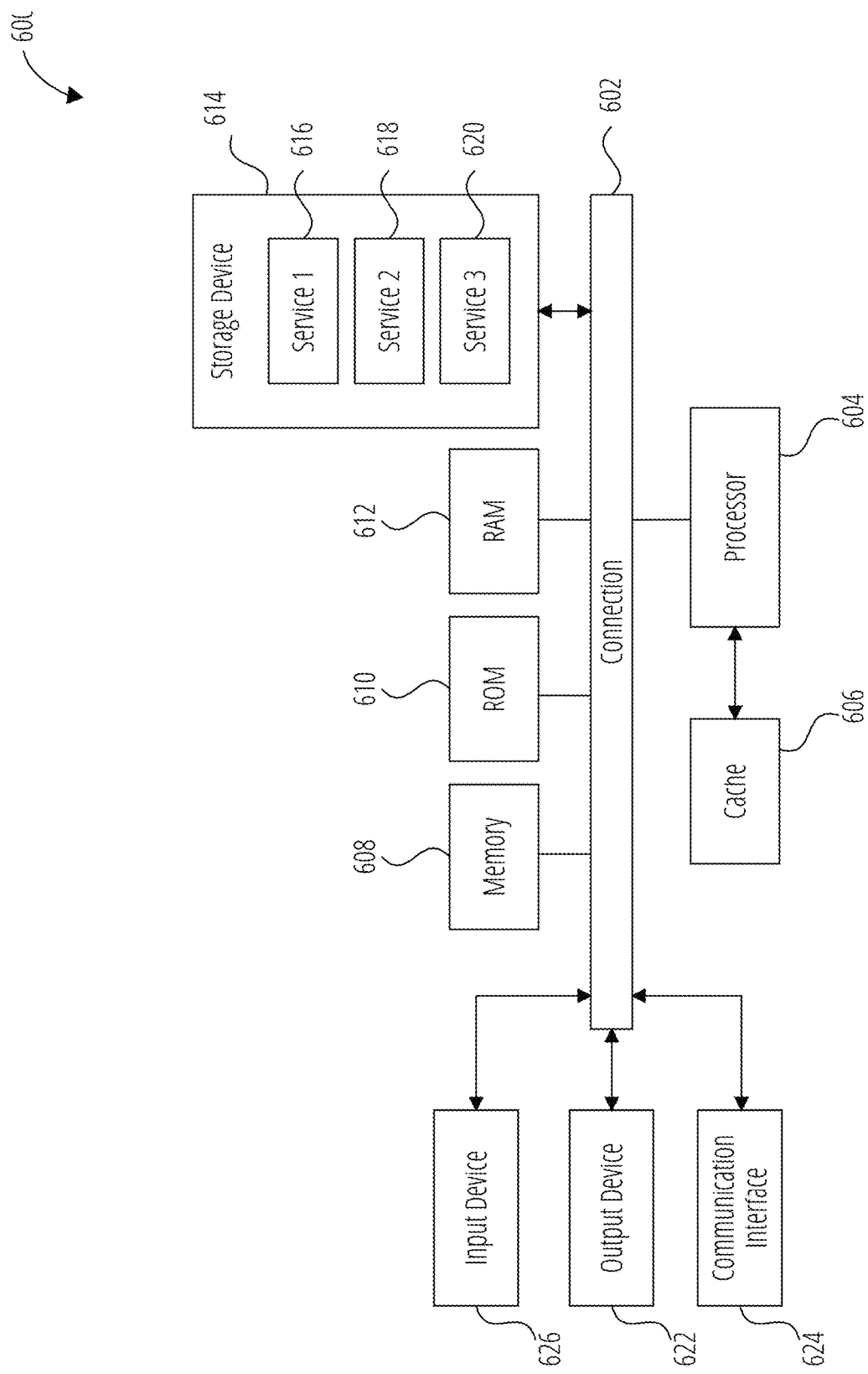
FIG. 6 shows an example of a system for implementing certain aspects of the present technology.

FIG. 6 shows an example of computing system 600, which can be for example any computing device making up the content management system 102 or notification manager 202, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In accordance with the above described technology, some aspects of the present technology include:

Aspect 1. A computer-implemented method comprising: receiving, by a notification manager, a first notification in a first source, wherein the first notification is directed to a first user account; categorizing, by the notification manager, the first notification into a first category, the first category is based on content of the first notification and categories learned from a plurality of notifications from a plurality of sources, wherein the plurality of sources include applications, channels within applications, client devices; and generating, by the notification manager, a responsive notification to the first notification based on information observed from other notifications of the first category.

Aspect 2. The computer-implemented method of Aspect 1, wherein the information observed from other notifications of the first category includes responsive notifications to past notifications in the first category by the first user account, wherein the other notifications of the first category can include notifications received on different channels than the first notification.

Aspect 3. The computer-implemented method of any of Aspects 1 to 2, wherein the generating the responsive notification to the first notification includes: determining the context for the first notification based on data from the channel and thread in which the first notification was received.

Aspect 4. The computer-implemented method of any of Aspects 1 to 3, wherein the generating the responsive notification to the first notification includes: identifying additional notifications in the first category within a data lake including the plurality of notifications from the plurality of sources irrespective of a respective user account to which the plurality of notifications are addressed; wherein the information observed from other notifications of the first category includes information in the additional notifications in the first category within the data lake.

Aspect 5. The computer-implemented method of any of Aspects 1 to 4, further comprising: presenting a consolidated notification assistant interface, wherein the consolidated notification assistant interface presents at least one thread of communications between the notification manager and the first user account.

Aspect 6. The computer-implemented method of any of Aspects 1 to 5, wherein the at least one thread of communications between the notification manager and the first user account includes a summary of the at least several of the plurality of notifications from a plurality of sources, wherein the summary is of the at least several of the plurality of the notifications pertaining to the first category, for example, the plurality of the notifications may have been received across several channels but all pertain to the first category.

Aspect 7. The computer-implemented method of any of Aspects 1 to 6, wherein the at least one thread of communications between the notification manager and the first user account includes a summary of the first notification, contextual information for the first notification, the responsive notification to the first notification prepared by the notification manager, and a responsive notification status, wherein the contextual information for the first notification includes a summary of other messages in the same thread.

Aspect 8. The computer-implemented method of any of Aspects 1 to 7, wherein the responsive notification status is a prompt for the user account to approve the responsive notification prepared by the notification manager.

Aspect 9. The computer-implemented method of any of Aspects 1 to 8, wherein the responsive notification status informs the first user account that the responsive notification prepared by the notification manager was automatically sent.

Aspect 10. The computer-implemented method of any of Aspects 1 to 9, further comprising: receiving, by the consolidated notification assistant interface, a communication from the first user account to the notification manager, wherein the communication is provided in a natural language format, wherein the notification manager participates in the consolidated notification assistant interface as a chat bot.

Aspect 11. The computer-implemented method of any of Aspects 1 to 10 further comprising: determining a confidence score for the responsive notification prepared by the notification manager.

Aspect 12. The computer-implemented method of any of Aspects 1 to 11, wherein the confidence score can be a confidence in one or more of correct identification of the category, correct identification of the contextual information for the first notification, quality of the proposed responsive notification, and correct identification of recipients of the proposed responsive notification.

Aspect 13. The computer-implemented method of any of Aspects 1 to 12, further comprising: automatically sending the responsive notification prepared by the notification manager when the confidence score is above a threshold; preparing the prompt for the user account to approve the responsive notification prepared by the notification manager when the confidence score is below a threshold, wherein when the confidence score is comprised of a composite of confidences scores for confidence in one or more of correct identification of the category, correct identification of the contextual information for the first notification, quality of the proposed responsive notification, and correct identification of recipients of the proposed responsive notification, finding the confidence score to be below the threshold if any part of the composite is below the threshold.

Aspect 14. The computer-implemented method of any of Aspects 1 to 13, wherein the plurality of the notifications from the plurality of sources includes notifications from across an enterprise, the method further comprising: storing, the plurality of the notifications from the plurality of sources in an organization-wide data lake, wherein the notifications are stored in the data lake with metadata identifying parties to the notifications.

Aspect 15. The computer-implemented method of any of Aspects 1 to 14 or 15, wherein the categorizing the first notification further comprises: determining a context for the first notification based on data from a channel and a thread in which the first notification was received; and utilizing a classification model to match the first notification to the first category based on the content of the first notification and the data from the channel and the thread in which the first notification was received.

Aspect 16. The computer-implemented method of any of Aspects 1 to 15, wherein the generating the responsive notification to the first notification based on information observed from other notifications of the first category further comprises: providing a prompt to a generative model to formulate the responsive notification based on the plurality of the notifications in the organization-wide data lake or the first user account-specific database; obtaining a quality score for the responsive notification from the generative model, wherein the generative model provides a quality score that indicates a confidence that the responsive notification from the generative model was responsive to the prompt; and determining a sharing score from a sharing model, wherein the sharing score indicates a confidence that information in the responsive notification to the first notification can be provided to recipients of the responsive notification.

Aspect 17. The computer-implemented method of any of Aspects 1 to 16, wherein the generative model is fine-tuned using the notifications in the organization-wide data lake, wherein the generative model is a large language model, wherein the generating a portion of the responsive notification includes using the generative model to summarize relevant information in the organization-wide data lake or the first user account-specific database.

Aspect 18. The computer-implemented method of any of Aspects 1 to 17, wherein the sharing model is configured to determine a classification of confidentiality for information included in the responsive notification to the first notification, the determination of the classification of confidentiality for information is based on past sharing of the information, sharing of content items including the information, labels indicating a confidential status of channels or documents including the information wherein example classifications can be public, organization confidential, or team confidential, wherein the sharing model is a machine learning algorithm with a classifier.

Aspect 19. The computer-implemented method of any of Aspects 1 to 18, wherein the generating the responsive notification to the first notification based on information observed from other notifications of the first category further comprises: determining another user account other than the first user account represented within the organization-wide data lake that is associated with notifications or documents relevant to a query within the first notification; and including a suggestion to contact the user account other than the first user account to receive additional information relevant to the query.

Aspect 20. The computer-implemented method of any of Aspects 1 to 19, wherein the plurality of the notifications from the plurality of sources includes notifications addressed to the first user account, the method further comprising: storing, the plurality of the notifications from the plurality of sources in a first user account-specific database, wherein the notifications are stored in the first user account-specific database with metadata identifying parties to the notifications, wherein the first user account-specific database further includes documents to which the first user account has access.

Aspect 21. The computer-implemented method of any of Aspects 1 to 20, further comprising: merging the first user account-specific database with a second user account-specific database for a user account at the same organization when the first user account has left the organization.

Aspect 22. The computer-implemented method of any of Aspects 1 to 21, wherein the generating the responsive notification to the first notification further comprises: searching for content that is relevant to the first notification, and limiting an informational portion of the responsive notification to the notification to content derived from the content that is relevant to the first notification.

Aspect 23. The computer-implemented method of any of Aspects 1 to 22, further comprising: receiving a second notification and a third notification, wherein the second notification and the third notification contain similar information, but are received in different channels; preparing, by the notification manager, a single summary of the notifications in the consolidated notification assistant interface.

What is claimed is:
1. A computer-implemented method comprising:
receiving, by a notification manager, a first query regarding a first topic from a first source, wherein the first query is directed to a first user account;
receiving, by the notification manager, a first response to the first query from the first user account;
categorizing, by the notification manager, the first query and the first response based on the first topic into a first category, the first category is based on content of the first query, the first response, and categories identified by a machine learning model from a plurality of notifications from a plurality of sources, including previously received communications, wherein the machine learning model is configured to determine the first category based on context and content of previous communications and determine that the first category and the first response are responsive to the first query based on the content of previous communications;
receiving a second query regarding the first topic from a second source, wherein the second query is directed to the first user account; and
generating, by the notification manager, a second response to the second query based on the first response and information observed from other notifications of the first category, wherein the second response is based on a confidence score determined by the notification manager.

2. The computer-implemented method of claim 1, wherein the generating the response to the second query includes:
determining a context for the second query based on data from the first source in which the first query was received.

3. The computer-implemented method of claim 1, further comprising:
presenting a consolidated notification assistant interface, wherein the consolidated notification assistant interface presents at least one thread of communications between the notification manager and the first user account.

4. The computer-implemented method of claim 3, wherein the at least one thread of the communications between the notification manager and the first user account includes a summary of at least several notifications from the plurality of sources.

5. The computer-implemented method of claim 3, further comprising:
receiving, by the consolidated notification assistant interface, a communication from the first user account to the notification manager, wherein the communication is provided in a natural language format, wherein the notification manager participates in the consolidated notification assistant interface as a chat bot.

6. The computer-implemented method of claim 1, wherein determining the confidence score includes at least one of a confidence in one or more of a correct identification of the first category, a quality of the second response, or a correct identification of recipients of the second response.

7. The computer-implemented method of claim 1, wherein the categorizing the first query further comprises:
determining a context for the first query based on data from the first source in which the first query was received; and
utilizing a classification model to match the first query to the first category based on the content of the first query and the data from the first source in which the first query was received.

8. The computer-implemented method of claim 1, wherein the generating the second response to the second query includes:
identifying additional notifications in the first category within a data lake including the plurality of notifications from the plurality of sources irrespective of a respective user account to which the plurality of notifications is addressed;
wherein the information observed from the other notifications of the first category includes information in the additional notifications in the first category within the data lake.

9. A computing system comprising:
at least one processor; and
a memory storing instructions that, when executed by the at least one processor, configure the system to:

receive, by a notification manager, a first query regarding a first topic from in a first source, wherein the first query is directed to a first user account;
receive, by the notification manager, a first response to the first query from the first user account;
categorize, by the notification manager, the first query and the first response based on the first topic into a first category, the first category is based on content of the first query, the first response, and categories identified by a machine learning model from a plurality of notifications from a plurality of sources, including previously received communications, wherein the machine learning model is configured to determine the first category based on context and content of previous communications and determine that the first category and the first response are is responsive to the first query based on the content of previous communications;
receive a second query regarding the first topic from a second source, wherein the second query is directed to the first user account; and
generate, by the notification manager, a second response to second query based on the first response and information observed from other notifications of the first category, wherein the second response is based on a confidence score determined by the notification manager.

10. The computing system of claim 9, wherein the generating the second response to the second query includes:
determine a context for the second response based on data from the first source in which the second response was received.

11. The computing system of claim 9, wherein the instructions further configure the system to:
present a consolidated notification assistant interface, wherein the consolidated notification assistant interface presents at least one thread of communications between the notification manager and the first user account.

12. The computing system of claim 11, wherein the at least one thread of the communications between the notification manager and the first user account includes a summary of at least several notifications from the plurality of sources.

13. The computing system of claim 9, wherein the instructions further configure the system to:
determine the confidence score based on at least one of a confidence in one or more of a correct identification of the first category, a quality of the second response, or a correct identification of recipients of the second response.

14. The computing system of claim 9, wherein the categorizing the first query further comprises:
determine a context for the first query based on data from the first source in which the first query was received; and
utilize a classification model to match the first query to the first category based on the content of the first query and the data from the first source in which the first query was received.

15. A non-transitory computer-readable storage medium, the computer-readable storage medium including instructions that when executed by at least one processor, cause the at least one processor to:
receive, by a notification manager, a first query regarding a first topic from a first source, wherein the first query is directed to a first user account;

receive, by the notification manager, a first response to the first query from the first user account;

categorize, by the notification manager, the first query and the first response based on the first topic into a first category, the first category is based on content of the first query, the first response, and categories identified by a machine learning model from a plurality of notifications from a plurality of sources, including previously received communications, wherein the machine learning model is configured to determine the first category based on context and content of previous communications and determine that the first category and the first response are responsive to the first query based on the content of previous communications;

receive a second query regarding the first topic from a second source, wherein the second query is directed to the first user account; and generate, by the notification manager, a second response to the second query based on the first response and information observed from other notifications of the first category, wherein the second response is based on a confidence score determined by the notification manager.

16. The computer-readable storage medium of claim 15, wherein the generating the second response to the second query includes:
determine a context for the second response based on data from the first source in which the second query was received.

17. The computer-readable storage medium of claim 15, wherein the instructions further configure the at least one processor to:
present a consolidated notification assistant interface, wherein the consolidated notification assistant interface presents at least one thread of communications between the notification manager and the first user account.

18. The computer-readable storage medium of claim 17, wherein the instructions further configure the at least one processor to:
receive, by the consolidated notification assistant interface, a communication from the first user account to the notification manager, wherein the communication is provided in a natural language format, wherein the notification manager participates in the consolidated notification assistant interface as a chat bot.

19. The computer-readable storage medium of claim 15, wherein the instructions further configure the at least one processor to:
determine the confidence score based on at least one of a confidence in one or more of a correct identification of the first category, a quality of the second response, or a correct identification of recipients of the second response.

20. The computer-readable storage medium of claim 15, wherein the categorizing the first query further comprises:
determine a context for the first notification query based on data from the first source in which the first query was received; and
utilize a classification model to match the first query to the first category based on the content of the first query and the data from the first source in which the first query was received.

* * * * *